United States Patent [19]

Braeger

[11] 4,151,629
[45] May 1, 1979

[54] METHOD AND DEVICE FOR GAINING FISH MEAT
[75] Inventor: Horst Braeger, Lübeck, Fed. Rep. of Germany
[73] Assignee: Nordischer Maschinenbau Rud. Baader, Lübeck, Fed. Rep. of Germany
[21] Appl. No.: 750,693
[22] Filed: Dec. 15, 1976

Related U.S. Application Data
[63] Continuation of Ser. No. 215,786, Jan. 8, 1972, abandoned.
[51] Int. Cl.$^2$ .................. A22C 25/16; A22C 25/18
[52] U.S. Cl. ........................................... 17/45; 17/57; 17/61
[58] Field of Search .................. 17/55, 56, 57, 61, 45
[56] References Cited

U.S. PATENT DOCUMENTS

| 2,712,153 | 7/1955 | Berglund | 17/57 |
| 2,955,316 | 10/1960 | Danielsson | 17/55 X |
| 3,525,120 | 8/1970 | Jobmann | 17/57 X |

FOREIGN PATENT DOCUMENTS 813564  5/1969  Canada .................. 17/57

Primary Examiner—Travis S. McGehee
Attorney, Agent, or Firm—Saul Jecies

[57] ABSTRACT

This invention is concerned with the gaining of high quality fish meat from parts which remain on the skeleton of the fish after it has been filleted. The method according to the invention consists in that those parts of the skeleton including the dorsal and the belly extensions of the vertebras are separated by cutting from that part of the vertebral column disposed in the zone of the abdominal cavity and the blood bag. The first parts, including the high quality meat, are then subjected to a removing process in which the high quality meat is separated from the bones, while the latter part, which is not suitable as human nutrition, is waste and is further processed in any customary manner. The device for carrying this method into effect comprises guide means arranged in spaced parallel relation to each other so as to form a slot between them for guiding the vertebral column and feeding the skeleton towards cutting means which will separate the zone of the abdominal cavity with the blood bag from these parts carrying remnants of high quality meat. These latter parts will then be removed to separate the high quality meat from the bones what, however, does not form part of this invention.

8 Claims, 4 Drawing Figures

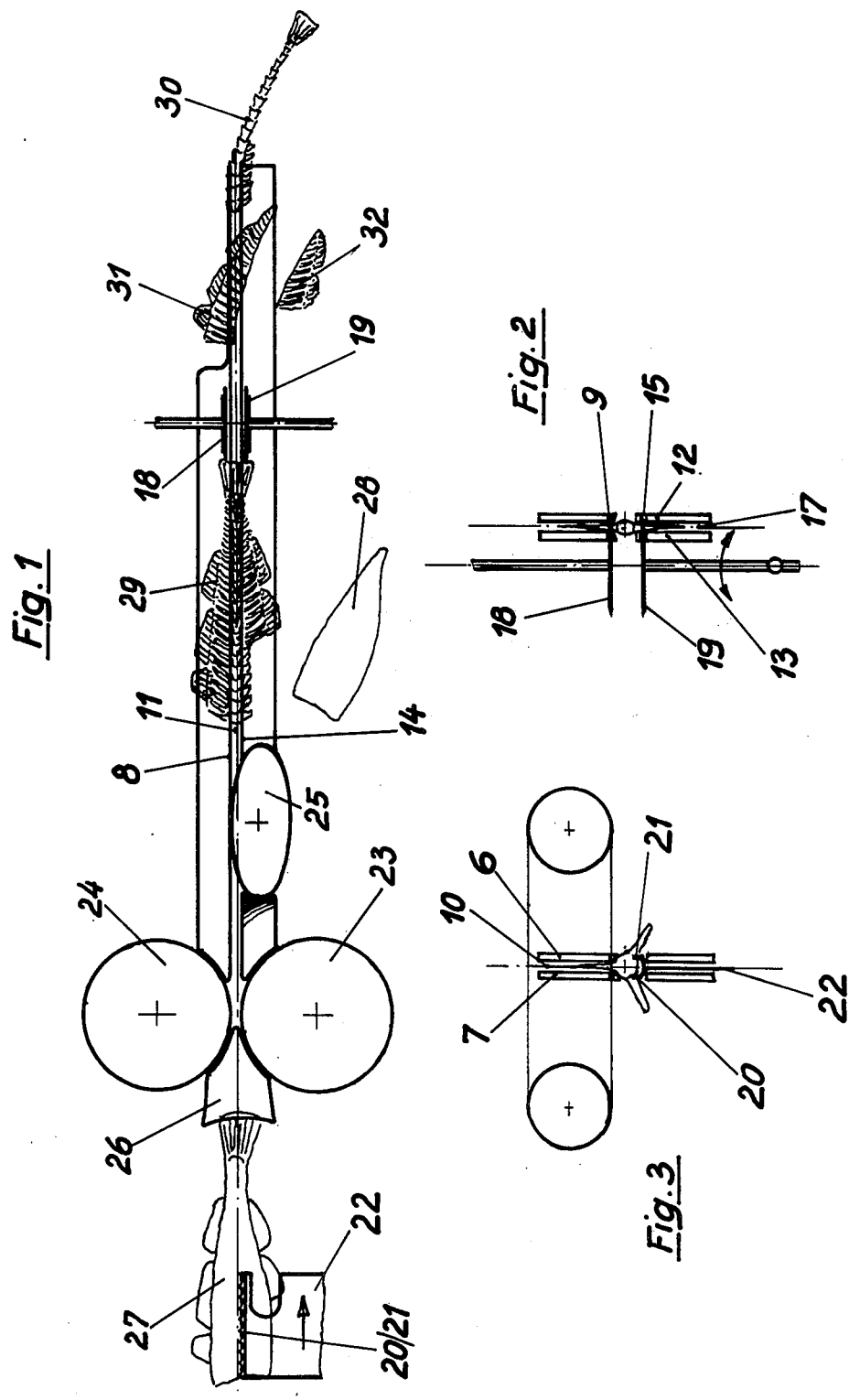

METHOD AND DEVICE FOR GAINING FISH MEAT

The present application is a continuation application of application Ser. No. 215,789, filed Jan. 8, 1972 now abandoned.

BACKGROUND OF THE INVENTION

It is known in filleting fish to regain meat parts, which remain on the sceleton and cannot be gained directly with the fillets in such a manner that the skeleton after filleting of the fish are subjected to a press passing process. In this way a product is obtained which contains, besides fish albumen, strips of the black skin of the abdominal cavity, parts of the air-bladder, and the remaining contents of the abdominal cavity, also blood particles which together cause a discoloration of the product excluding the use as human nourishment.

SUMMARY OF THE INVENTION

The general object of this invention is to separate the zone of the abdominal cavity with its contents including the black skin, the air bladder and the blood bag from the remaining part of the skeleton of a fish which has previously been filleted in a well known manner and recover the high quality meat as human nutrition by an also well known passing or straining process in which the meat is separated from the bones.

According to the method of this invention this is realized by conveying the fish skeleton in a selection position towards cutting means separating by cutting the zone of the abdominal cavity with the blood bag from those parts of the sceleton carrying remnants of high quality meat.

A device for practicing this method comprises guide means arranged in parallel relation forming a guide path for the vertebral column of the fish skeleton which is somewhat wider then the diameter of the vertebras of the largest fish, at least one rotating cutting means located adjacent said guide means cutting closely along said vertebral column as said skeleton is moved therealong, and mounted for pivotal motion allowing to swing it out of the path of movement of said skeleton, whereby the abdominal cavity with the blood bag is separated from the remainder of the skeleton.

The particular advantages achieved by the invention are to be seen in the fact that upon passing the separated parts a product of pure not discoloured and almost sterile fish meat is obtained which, as a high quality product may be used not only for making fish meat balls, but also as addition for frozen packages.

According to a preferred method of the invention the separation is achieved mechanically in the filleting machine while the skeleton is guided in the position required for the prior filleting process. In this manner the gaining of the separated parts is possible without additional expenditure of labour in one and the same working step with the filleting.

Further objects and features of the invention will become evident from the following description in connection with the annexed drawings and it will be seen that the method as well as the device for practicing the method may vary without departing from the general scope of the invention.

BRIEF DESCRIPTION OF THE DRAWINGS

FIG. 1 is a diagrammatical side view of a mechanical device for practicing the method according to the invention;

FIG. 2 is a diagrammatical cross sectional view of the device shown in FIG. 1, taken adjacent the bone cutting knives;

FIG. 3 is a diagrammatical cross sectional view adjacent the modified upper bone cutting knife.

DESCRIPTION OF THE PREFERRED EMBODIMENTS

Figure 4:
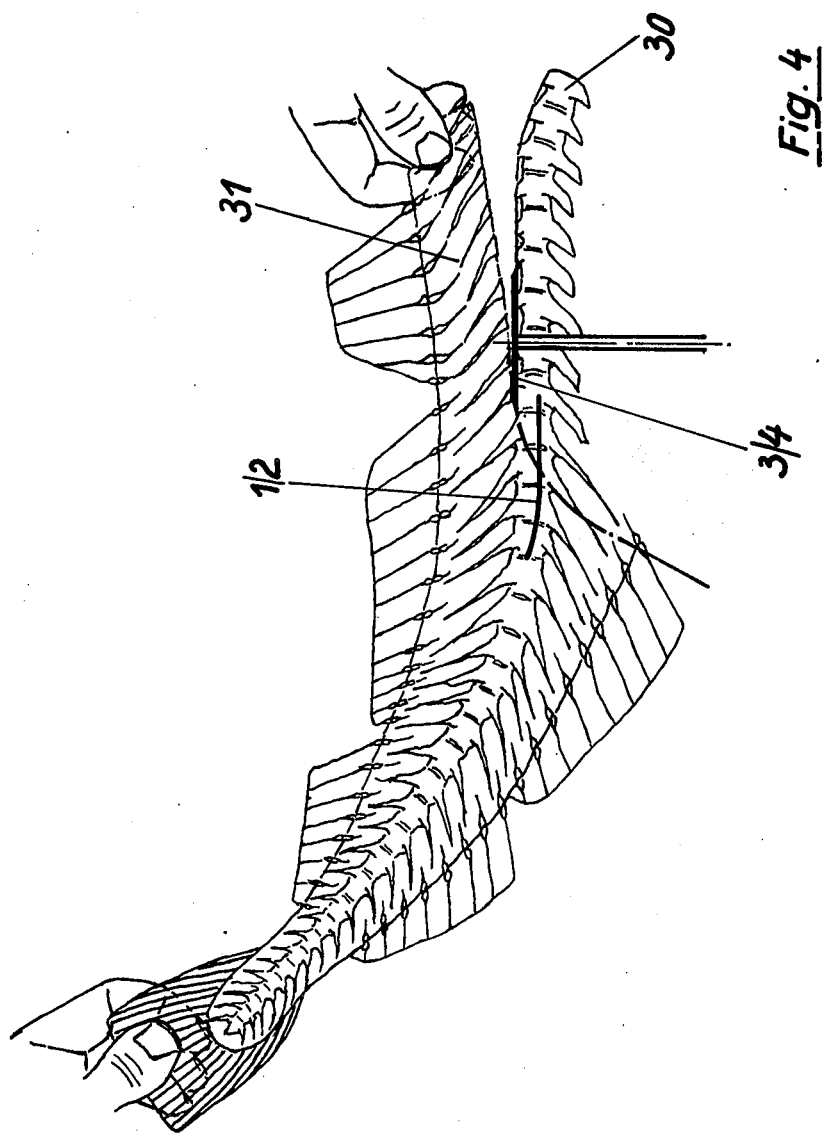
FIG. 4 is a manually fed device.

In FIGS. 1 to 3 tools and guide means of a filleting machine are shown in a diagrammatical manner while, for the sake of clarity and simplicity, the frame, the drives, the transmissions, and control means, and also the conveying means have been omitted.

Arranged upstream of the belly slitting knives 23 and the back cutting knives 24 there are a pair of lead-in flaps 26, and downstream thereof a pair of rib cutting knives 25 inclined relative to each other. The belly slitting knives 23, the back cutting knives 24, and the rib cutting knives 25 are formed as circular knives, driven in any suitable manner. Two pairs of bone guides 6, 7 and 12, 13 defining a space 11 between them are arranged in the plane of the belly slitting knives and the back cutting knives and downstream thereof. The upper bone guides 6 and 7 define a gap 10 serving as a guide path for the dorsal extensions, while the lower bone guides 12 and 13 define a gap 17 serving as a guide for the belly extensions of the skeleton. The opposite edges of the four bone guides together serve to guide the vertebras of the vertebral column which is advanced through the space 11. This space 11 simultaneously serves as a passage for rows of prongs 20 and 21 of a push saddle. Downstream of the rib cutting knives 25 slots 9 are defined between the upper bone guides 6 and 7 adjacent their lower edges 8. A rotatably driven circular bone cutting knife 18 extends through the gap 10 and into slots 9. An also rotatably driven circular bone cutting knife 19 mounted to be pivotal in- and outwardly extends in similar manner into slots 15 located adjacent the upper edges 14 of the lower bone guides 12 and 13. For advancing the fish push saddle conveyors 22 are provided moving continuously in the direction indicated by an arrow. These push saddle conveyors are inserted into the abdominal cavity of a fish and engage with their two rows of prongs 20 and 21 the edges of the vertebras, or their extensions respectively.

The mode of operation of the device is as follows:

A fish placed with its abdominal cavity on the push saddle 22 with its tail directed forwardly is pushed against the back cutting knives 24 and the rib cutting knives 25, thereby severing and separating the two fish fillets and allowing their transport to skinning machines, or the like devices, to be further processed. The skeleton freed of the muscular meat is further advanced and gets into the effective zone of the bone cutting knives 18 and 19 which will separate by cuts leading closely along the upper and lower edge of the vertebral column, the bone strip 31 containing the dorsal extensions and the bone strip 32 containing the belly extensions. In this the upper bone knife 18 may remain in its cutting position, while the lower bone knife 19 is pivoted outwardly of its cutting position upon reaching the abdominal cavity. In this manner clearance for the passage of the push saddle is obtained. The two bone strips 31 and 32 may be fed to a passing machine, while the vertebral column 30 is separately fed to the waste.

Instead of conveying the fish by means of a push saddle also a tail clamp, or a pair of conveyor bands provided with serrations or needles may be used engaging the fish at its sides. In the latter case it is necessary to provide conveying means downstream of the rib cutting knives engaging the vertebral column of the fish. For this purpose pairs of serrated rollers, or serrated discs, or prong bands respectively, engaging the dorsal vertebras on their extensions through the abdominal cavity have been found to be suitable. If required prong bands arranged upstream of the bone cutting knives, and serrated rollers arranged therebehind may be used. Instead of the circular knives, pairs of shear-like cutting circular knives, or endless band knives may be used, as shown in FIG. 3.

The recovery of the passable parts of meat from the skeletons of fish which have been filleted manually, or by means of customary filleting machines respectively, may also be achieved with the aid of a mechanical, manually handled, for example electrically or pneumatically driven scissors, or circular saw, or by using the device shown in FIG. 4. The latter comprises a pair of laterally spaced guides 1, 2 extending horizontally or slightly inclined upwardly. The space between the guides 1, 2 is greater than the diameter of the dorsal vertebras of the largest fish. Cutting means in form of a pair of shear-like cutting circular knives 3, 4, or an endless band knife respectively, may be provided above the plane of the guides 1, 2. The skeleton is gripped with the right hand at the tail fin, and is introduced by the right hand with its head end leading into the slot defined between the guides 1 and 2 is then pulled against the circular knives 3 and 4, while the left hand holds the skeleton tensioned in such a manner that the dorsal vertebra extensions engage the lower edges of the guides 1 and 2. In this the skeleton, after the end of the abdominal cavity has passed the circular knives 3 and 4, slides so that the vertebral column in the zone of the tail remains on the bone strips. This cutting path is indicated in FIG. 4 by the phantom line.

What is claimed is:

1. A method of recovering residual edible fish meat from a fish skeleton from which the fillets have already been taken, comprising the steps of
   conveying the fish skeleton in a selected orientation towards a cutting station; and
   cutting at said station from said fish skeleton the zone of the abdominal cavity together with the adhering blood bag which are both still present after taking off the fillets, so as to separate the blood bag from said skeleton which carries residual edible fish meat.

2. The method as defined in claim 1, wherein the step of conveying comprises advancing the fish skeleton with the tail end thereof leading; and
   the step of cutting comprises making upper and lower cuts closely along the upper and lower boundaries of the vertebral column and deflecting the lower cut prior to reaching the abdominal cavity with the blood bag so as to sever the blood bag from the skeleton.

3. The method as defined in claim 1, wherein the step of conveying comprises advancing the fish skeleton with the head end thereof leading; and
   the cutting step comprises effecting a cut extending closely along the upper boundary of the vertebral column to remove the dorsal extensions of the vertebrae, and deflecting said cut downwardly directly behind the abdominal cavity so as to separate the forward part of the vertebral column with the abdominal cavity and with the blood bag from said skeleton.

4. An apparatus for recovering residual edible fish meat from a fish skeleton from which the fillets have already been taken, comprising
   means for conveying the fish skeleton in a selected orientation along a path;
   cutting means for cutting from the conveyed skeleton the zone of the abdominal cavity, together with the adhering blood bag which are both present after taking off the fillet so as to separate the blood bag from said skeleton which carries residual edible fish meat; and
   guide means for guiding said fish skeleton of said both towards said cutting means;
   said guide means comprising guide elements arranged in parallellism with each other forming a guide path for the vertebral column and being spaced from one another at a distance somewhat greater than the diameter of the vertebrae of the largest fish to be guided by said guide means.

5. An apparatus as defined in claim 4, wherein said cutting means comprises at least one rotary cutter located adjacent said guide means and arranged for cutting closely along and parallel to the vertebral column of a fish skeleton being conveyed along said guide means, and means mounting said cutter for pivotal movement out of the path of the advancing fish skeleton and for cutting away the abdominal cavity and the blood bag.

6. An apparatus as defined in claim 4, wherein said cutting means comprises a cutting element arranged adjacent to but forwardly of said guide means and operative for effecting a cut along and parallel to an upper edge of the vertebral column, and means mounting said cutting element for pivotal movement to a position in which said cutting element cuts off the head-end part of the vertebral column together with the abdominal cavity and blood bag.

7. An apparatus for gaining edible fish meat from a fish carcass, comprising
   a pair of back filleting knives;
   a pair of belly filleting knives and
   a pair of ribbing knives;
   a pair of upper bone guides having upper edges and lower edges, arranged downstream the back filleting knives and at a distance to each other; and
   a pair of lower bone guides having upper edges and lower edges, arranged downstream the ribbing knives, below the upper bone guides, and at a distance to each other;
   the upper edges of the lower bone guides being in spaced relationship to the lower edges of the upper bone guides;
   transport means for movably engaging the fish carcass;
   a first bone cutter arranged across and close to the gap between the lower edges of the upper bone guides; and
   a second bone cutter arranged across and close to the gap between the upper edges of the lower bone guides;

the cutting edges of the two bone cutters being agitated at high speed.

8. An apparatus for recovering residual edible fish meat from a fish skeleton from which the fillets have already been taken, comprising means for conveying the fish skeleton in a selected orientation along a path; and non-overlapping cutting means for cutting from the conveyed skeleton the zone of the abdominal cavity, together with the adhering blood bag which are both present after taking off the fillet so as to separate the blood bag from said skeleton which carries residual edible fish meat;

said cutting means comprising two rotary cutters located adjacent said conveying means at opposite sides of said path, one of said cutters being a first bone cutting blade rotating in a horizontal plane and arranged adjacent a lower edge of said conveying means, and the other of said cutters being a second bone cutting blade also rotating in a horizontal plane and arranged adjacent an upper edge of said conveying means.

* * * * *